United States Patent
Laroia et al.

(10) Patent No.: US 6,542,276 B1
(45) Date of Patent: Apr. 1, 2003

(54) METHOD AND APPARATUS FOR INCREASING THE SPECTRAL EFFICIENCY OF DENSE WAVELENGTH DIVISION MULTIPLEXED SYSTEMS

(75) Inventors: Rajiv Laroia, Princeton Junction, NJ (US); James Emery Mazo, Somerset, NJ (US); Jason Blain Stark, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/143,189

(22) Filed: Aug. 28, 1998

(51) Int. Cl.[7] .............................................. H04B 10/04
(52) U.S. Cl. ..................................... 359/187; 359/180
(58) Field of Search ................................ 359/109, 161, 359/180, 181, 183, 187, 188

(56) References Cited

U.S. PATENT DOCUMENTS 4,349,887 A * 9/1982 Crowley ..................... 327/107
5,329,393 A * 7/1994 Huang ......................... 359/135

* cited by examiner

Primary Examiner—Leslie Pascal

(57) ABSTRACT

A method for increasing the spectral efficiency of a transmitted signal. The signal includes a sequence of symbols selected from a set of symbols with each of the symbols having an associated numerical value. A symbol is output from the sequences symbols. A spectral sum is determined by summing the numerical values of all the symbols that have been previously output. A first sum is calculated by adding the numerical value of the next symbol to be output to the spectral sum. A second sum is calculated by subtracting the numerical value of the next symbol to the output from the spectral sum. The next symbol will be output with the positive phase if the first sum is less than the second sum. The next symbol will be output with the negative phase if the first sum is greater than the second sum. If the first sum equals the second sum the next symbol is output with either a positive phase or negative phase.

14 Claims, 6 Drawing Sheets

METHOD AND APPARATUS FOR INCREASING THE SPECTRAL EFFICIENCY OF DENSE WAVELENGTH DIVISION MULTIPLEXED SYSTEMS

FIELD OF THE INVENTION

This invention relates to the field of communications systems and, in particular, to a method and apparatus for utilizing transmission bandwidth more efficiently in Dense Wavelength Division Multiplexed systems.

BACKGROUND OF THE INVENTION

To meet today's demand for high-speed cost-effective communications, optical transmission systems having increased data capacity are highly desirable. One approach used in modem high-capacity transmission systems to increase the aggregate data-rate of transmission systems is to use a technique called dense wavelength division multiplexing (DWDM). In DWDM, an optical transmission link is divided into a plurality of channels with each channel having its own center frequency. Data transmitted on a particular channel is then effected by modulating the optical carrier at the center frequency of that channel. At the receiver, a band-pass filter tuned to the center frequency of the channel is used for detecting and demodulating the transmitted signal. By combining a plurality of channels in this manner, the aggregate data capacity of the optical link is increased. For example, using this technique, optical transmission systems with an aggregate data-handling capacity of 1 terabit per second have been demonstrated. See H. Onaka, et al. "1.1 Tb/s WDM transmission over 150 km 1.3 mm zero-dispersion single mode fiber," *Proc. OFC '96*, PD19, 1996; A. H. Gnauck, et al, "One terabit/s transmission experiment," *Proc. OFC '96*, PD20, 1996; T. Morioka, et al. "100 Gbit/s×10 channel OTDM/WDM transmission using a single supercontinuum WDM source," *Proc. OFC '96*, PD21, 1996; Y. Yano, et al. "2.6 Tb/s WDM transmission experiment using optical duobinary coding," *Proc. ECOC '96*, ThB3.1, 1996. A limitation in increasing the aggregate data-handling capacity of optical transmission systems is the amount of separation required between adjacent channels sufficient to reduce cross-channel interference to acceptable levels. Channel separations in the range of 100 GHz are commonly used to achieve sufficient separation.

A drawback of prior art optical transmission systems is that the aggregate data rate presently achievable, 1 Tb/s, is still orders of magnitude below the total capacity of optical fiber. In other words, the spectral efficiency (defined as the ratio between the aggregate bit rate transmitted over the optical link and the total optical bandwidth) of prior art systems is not maximized for several reasons. First, the need to maintain channel separation of 100 GHz to reduce interference between channels reduces the number of channels that can be multiplexed on the optical link. As a result, the aggregate bit rate of the optical link is limited thereby reducing the spectral efficiency of the transmission system. Also, because dispersion and nonlinearities in the optical transmission link limits the modulation bandwidth, and thus the bit-rate of any particular signal channel, the spectral efficiency of the system is decreased. Spectrally efficient signaling techniques, such as duobinary signaling, have been investigated in an attempt to reduce the spectral bandwidth required for each particular channel so that more channels can be supported by an optical link. See A. Lender, "Correlative digital communication techniques," *IEEE Trans. Commun. Technol.*, vol. COM-12, p. 128, 1964; X. Gu and L. C. Blank, "10 Gbit/s unrepeatered three-level optical transmission over 100 km of standard fiber," *Electron. Lett.*, vol. 29, p. 2209, 1993; A. J. Price and N. Le Mercier, "Reduced bandwidth optical digital intensity modulation with improved chromatic dispersion tolerance," *Electron. Lett.*, vol. 31, p. 58, 1995; D. Penninckx, et al, "Relation between spectrum bandwidth and the effects of chromatic dispersion in optical transmissions," *Electron. Lett.*, vol. 32, p. 1023, 1996.

In duobinary signaling the required spectral bandwidth for a channel is reduced by manipulating the phase of the output data symbols transmitted over that channel. In duobinary, the data to be output consists of a combination of zeros and ones. The phase of the output data symbols are selected as follows: 1's in the input data stream that are separated by an even number of 0's have an identical phase in the duobinary signal output while 1's that are separated by an odd number of 0's have an opposite phase to that of the previously output 1. For example, the input data sequence {1, 1, 0, 1, 0, 0, 1, 1} is converted to a duobinary signal output of {1, 1, 0, −1, 0, 0, −1, −1} where −1 denotes a data bit having an opposite phase of a 1 data bit. Although duobinary signally does increase spectrally efficiency of the transmission system by narrowing the spectral bandwidth required for a channel, it is desirable to provide other signaling techniques that further increase the spectral efficiency of optical transmission systems.

SUMMARY OF THE INVENTION

The present invention is directed at overcoming the shortcomings of the prior art. The present invention is directed to a method and apparatus for increasing the spectral efficiency of optical DWDM transmission systems by increasing the amount of data that can be transmitted through a channel without increasing the spectral bandwidth of the channel. The method of the present invention includes the step of outputting a symbol from a sequence of symbols to be output. Next, a spectral sum is calculated by summing the numerical values of all of the symbols that have been previously output. Next, a first sum is calculated by adding the numerical value of the next symbol to be output with a positive phase to the spectral sum calculated previously. Next, a second sum is calculated by adding the numerical value of the next symbol to be output with a negative phase to the spectral sum. The next symbol will be output with a positive phase if the magnitude of the first sum is less than the magnitude of the second sum. Next, the next symbol will be output with a negative phase if the magnitude of the first sum is greater than the magnitude of the second sum. If the magnitude of the first sum equals the magnitude of the second sum, the next symbol is output with either a positive phase or a negative phase. By manipulating the phase of the output symbol in such a manner, the spectral bandwidth of the output signal is band-limited to the Nyquist frequency even for quaternary signaling thus providing a two fold increase in spectral efficiency over duobinary.

In an alternative embodiment of the present invention, the set of all symbols that can be output is divided into a number of groups. If the next symbol to be output is, for example, from the first group, then the phase of the symbol is selected based on the number of symbols that were output from other groups since the last symbol that was output from the first group. If that number is odd, then the next symbol is output with the opposite phase from that of the last symbol output from the first group. If the number is even, then the next symbol is output with the same phase as that of the last symbol output from the first group. Selecting the phase in such a manner increases the spectral efficiency of the output signal as compared to duobinary.

In another alternative embodiment of the present invention, the set of all symbols that can be output is divided into a number of groups. If, for example, the next symbol to be output is from the first group, then the phase of the symbol will be the opposite of the phase of the last symbol output from the first group if there were any symbols output from other groups since the last symbol output from the first group. If no intervening symbols exist, then the phase of the next output symbol will be the same as the last symbol output from the first group. Selecting the phase in such a manner produces an output signal having a narrower spectral bandwidth and therefore a more spectrally efficient signal.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWING FIGURES

In the drawing figures, which are not to scale, and which are merely illustrative, and wherein like reference numerals depict like elements throughout the several views.

DETAILED DESCRIPTION OF THE PREFERRED EMBODIMENTS

Figure 1:
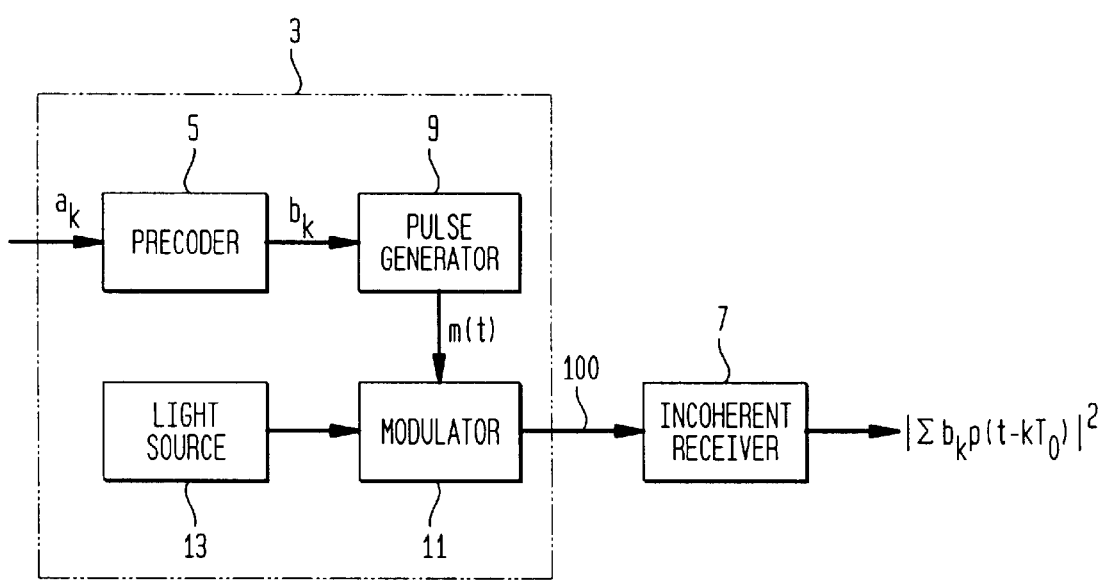
FIG. 1 is a schematic of a transmitter-receiver pair constructed in accordance with the present invention.

Spectrally efficient signaling techniques are desirable in DWDM optical transmission systems because they can increase the aggregate data-handling capacity of such systems. As a general principle, the spectral bandwidth required for a channel to reliably transmit data will be reduced by shifting the power spectrum of the transmitted signal away from the Nyquist frequency towards zero frequency. When this occurs, a narrower bandpass filter can be used to detect the data transmitted over the channels thereby allowing for more channels to be multiplexed over the optical link.

Furthermore, by narrowing the power spectral density of M-ary datastreams, the data-capacity of each channel can be increased. Binary datastreams carry one bit of information per output symbol. In an M-ary datastream, each input datum can take on one of M equally-likely values and therefore carries information equivalent to $\log_2 M$ bits per symbol. By transmitting symbols at a line rate R, M-ary codes can transmit R $\log_2 M$ bits per unit time. For example, a 4-ary, or quaternary line code, transmits two bits per symbol which is double the transmission rate for binary datastreams, given identical line rates. Thus, if the transmission of an M-ary line code can be accomplished within the same spectral bandwidth as that of a binary line code, the spectral efficiency of the transmitted M-ary datastream is increased by a factor of $\log_2 M$ over the binary datastream. Accordingly, by manipulating the phasing of an M-ary output symbol stream to reduce the spectral bandwidth of an M-ary output signal of a binary transmission, the spectral efficiency for the transmission system is increased.

In an optical transmission system, a data transmission consists of a series of symbols modulated on an optical carrier. Each symbol can be represented as a pulse envelope, having an electric field p(t), repetitively emitted with a period To, and multiplied by a modulation amplitude b that is the numerical value of the symbol. The field of the resulting symbol stream, called the modulation field, can be expressed as $$m(t) = \sum_k b_k p(t - kTo) \tag{1}$$

where $b_k$ is the modulation amplitude for the $k^{th}$ symbol in the symbol stream, also called the transmission line code. The electric field of the transmitted data is the product of modulation field, m(t), and the electric field of the optical carrier. Accordingly, by reducing the power spectral density of the modulation field, the power spectral density of the data transmission will also be reduced.

The power spectral density, $S_m(\omega)$ of modulation field m(t) is expressed as $$S_m(\omega) = |P(\omega)|^2 S_L(\omega) \tag{2}$$

where $P(\omega)$ is the Fourier transform of pulse p(t) according to the expression $$P(\omega) = \int_{-\infty}^{\infty} p(t) e^{-i\omega t} dt \tag{3}$$

and $S_L(\omega)$ is the power spectral density of the transmission line code expressed by $$S_L(\omega) = \frac{1}{To} \sum_{n=-\infty}^{\infty} R_n e^{in\omega To} \tag{4}$$

where $R_n$ is the line code autocorrelation function expressed by $$R_n = \lim_{N \to \infty} \frac{1}{N} \sum_{N_k = -\frac{N}{2}}^{N/2} b_k b_{k+n}^* = \langle b_k b_{k+n}^* \rangle. \tag{5}$$

Thus, according to equation (2), the power spectral density of the modulation field $S_M(\omega)$ will be reduced if the power spectral density of the line code $S_L(\omega)$ is reduced.

Referring now to FIG. 1, there is shown a schematic of a transmitter 3 and receiver 7 for transmitting and receiving digital information transmitted over an optical link. Transmitter 3 includes a pre-coder 5 which receives an input datastream $a_k$ and outputs a coded output symbol stream $b_k$. A pulse generator 9 receives as an input symbol stream $b_k$ and outputs an amplitude modulated symbol stream, m(t) (see equation (1)). Amplitude modulated symbol stream m(t) is then input to a modulator 11 in which m(t) is frequency modulated by a light source 13. The frequency modulated signal is then transmitted over an optical fiber 100 and received by receiver 7. In an exemplary embodiment, receiver 7 is a square-law receiver generating an output $|\Sigma b_k p(t-kTo)|^2$. Because the transmitted data is represented by the optical intensity of the signal, not the optical phase, receiver 7 is incoherent, i.e. does not measure the phase of the received signal. Thus, because the phase of the signal is not used to convey data, the phase of the transmitted signal can be manipulated to reduce the power spectral density of the transmitted signal without affecting the integrity of the data transmission.

Power spectral density $S_L(\omega)$ can be narrowed by manipulating the phase of output symbols b in a manner by which a spectral null is formed at any desired frequency. A spectral null can be positioned at a desired frequency in the spectrum of the transmitted signal by controlling the phase of the output symbols. This result follows from the fact that transmission line code power spectral density, $S_L(\omega)$, is equal to the average absolute square of an impulse spectral density, $I_N(\omega)$, normalized by the duration of the transmitted signal. This relationship is expressed by the equation:

$$S_L(\omega) = \lim_{N \to \infty} \frac{\overline{|I_N(\omega)|^2}}{NTo} \tag{6}$$

where impulse spectral density, $I_N(\omega)$ also called the spectral sum, is defined as:

$$I_N(\omega) = \int_{-\infty}^{\infty} dt e^{i\omega t} \sum_{k=0}^{N} b_k \delta(t - kTo) = \sum_{k=0}^{N} b_k e^{ikwTo} \tag{7}$$

It follows from equation (6) that if $I_N(\omega)$ is bounded within a range for a particular frequency $\omega$, then power spectral density $S_L(\omega)$ will be null at that frequency as $N \to \infty$.

Furthermore, through the appropriate selection of phases for modulation amplitudes, $b_k$, $I_N(\omega)$ may be bounded at any desired frequency thereby providing a spectral null at that frequency. For example, a line code with a null imposed at zero frequency can be converted to a line code with a null at the Nyquist frequency, $\omega = \pi/To$, by applying a phase shift of $e^{ik\pi} = (-1)^k$ to the kth output symbol $b_k$. By shifting the spectral null to the Nyquist frequency, power spectrum is shifted away from the Nyquist frequency towards zero frequency which results in the transmitted signal having a narrower spectral bandwidth. Also, by decreasing the spectral bandwidth of each channel, the penalties associated with dispersive propagation of the signal on a fiber-optic transmission line are also reduced. Furthermore, the elimination of a singular spectral contribution of the optical carrier frequency aids in reducing back-reflections due to stimulated Brillouin scattering.

According to the principles described above, the spectral efficiency of a transmission system is increased by manipulating the phase of the output symbols $b_k$ to place a spectral null at the Nyquist frequency. Described below are various embodiments of the present invention for manipulating the phase of output symbols $b_k$ for the purpose of increasing the spectral efficiency of the transmission system.

Bounded Spectral Sum (BOSS) Coding

In BOSS coding, the spectral density $S_L(\omega)$ is reduced by minimizing the magnitude of the spectral sum. As described above, equation (6) provides that the spectral density of the line code $S_L(\omega)$ is reduced when the spectral sum $I_N(\omega)$, is bounded. At zero frequency, the spectral sum, $I_N(\omega)$ (also called the running digital sum), is equal to the sum of the amplitudes of all transmitted symbols $$I_N(\omega) = \sum_{k=0}^{N} b_k. \tag{8}$$

Therefore, in BOSS coding, the phase of the next symbol to be output is selected so that the magnitude of the running digital sum is minimized.

Figure 2:
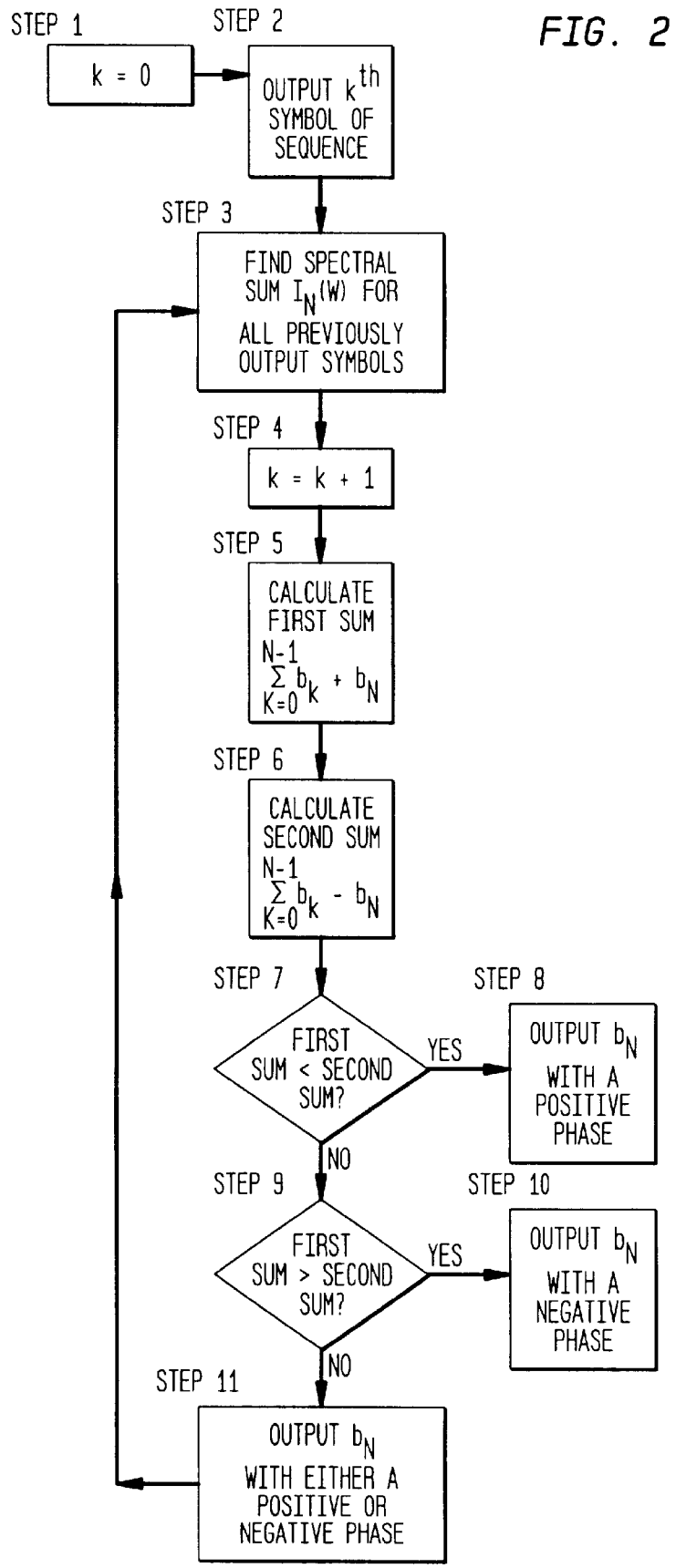
FIG. 2 is a logic flow chart for the BOSS coding method in accordance with an embodiment of the present invention.

Referring now to FIG. 2, there is shown a flowchart illustrating the BOSS coding method for selecting the phase of the next output symbol in a manner so that power spectrum is shifted from the Nyquist frequency toward zero frequency. In Step 1, k is initialized to zero and the method begins with the first symbol in the data sequence to be output. In step 2, the kth symbol in the data sequence is output. In step 3, the running digital sum—the sum of the numerical values of all the previous N symbols output—is calculated. In step 4, k is incremented to point to the next symbol in the data sequence. Next, in step 5, a first sum is calculated by adding $b_k$, the next symbol to be output, with a positive phase to the running digital sum $I_N(\omega)$ calculated in step 3. In step 6, a second sum is calculated in which $b_k$, having a negative phase, is added to the running digital sum $I_N(\omega)$. Next, in step 7, the first sum and the second sum are compared, and if the first sum is found to be less than the second sum, then outputting $b_k$ having a positive phase will minimize the magnitude of the running digital sum $I_N(\omega)$ and, consequently, the power spectral density of the output. Therefore, in step 8, $b_k$ is output with a positive phase. If, however, first sum is greater than second sum, then outputting $b_k$ having a negative phase will minimize the running digital sum and the power spectral density of the output. Thus, in step 10, $b_k$ is output with a negative phase. If the first sum equals the second sum, the phase of $b_k$ will not affect the spectral density of the output, and $b_k$ can be output with either a positive or negative phase, as in step 11. After $b_k$ is output, the process returns to step 3 in which a new running digital sum is calculated for all previously output symbols.

An example of BOSS coding applied to a data sequence is as follows. Assume $b_k \in \{0, 1, \sqrt{2}, \sqrt{3}\}$ and that the magnitude of the running digital sum of the previously output symbols is 1. Also assume that the next symbol to be output is $\sqrt{2}$. If $\sqrt{2}$ is output with a positive phase, the magnitude of the running digital sum would become 2.4142. If $\sqrt{2}$ is output with a negative phase, the magnitude of the running digital sum would become 0.4141. Because outputting $\sqrt{2}$ with a negative phase would minimize the magnitude of the running the digital sum, $\sqrt{2}$ is output with a negative phase.

Figure 3:
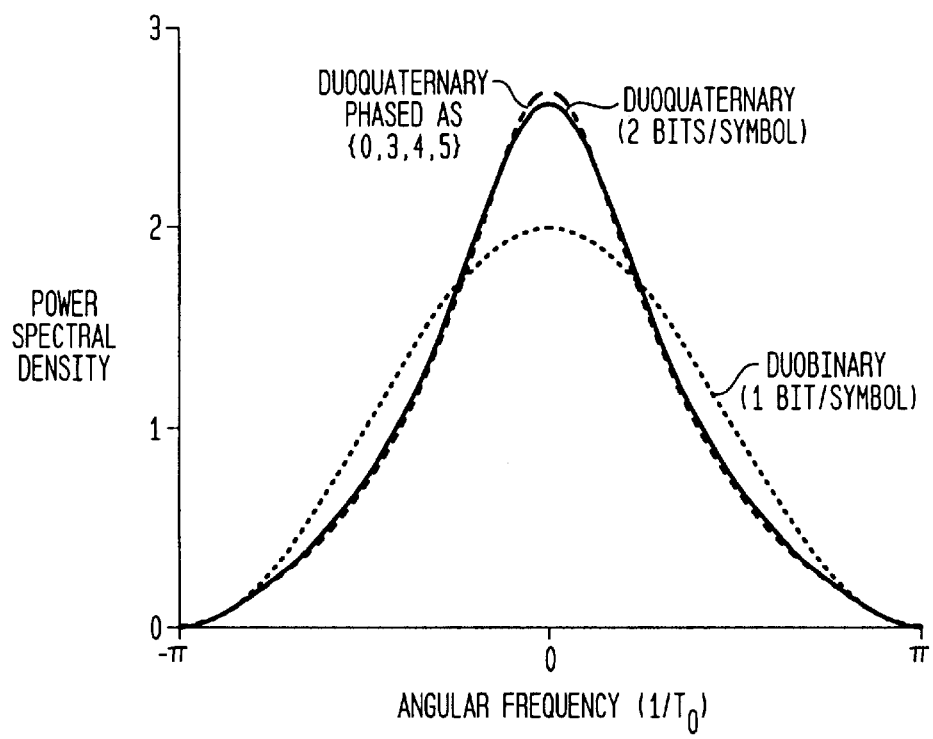
FIG. 3 is a graph comparing the power spectral densities of duobinary, duoquaternary and duoquaternary using a character set of {0, 3, 4, 5}.

Referring now to FIG. 3, there is shown a series of graphs of power spectral density as a function of angular frequency for duobinary and duoquaternary with $b_K \in \{0, 1, \sqrt{2}, \sqrt{3}\}$ using BOSS coding. As can be seen from FIG. 3, BOSS coded duoquaternary fits within the same spectral bandwidth as duobinary signaling. Because duoquaternary carries twice the information per symbol as duobinary, BOSS coded duoquaternary achieves twice the spectral efficiency as that of duobinary.

Ideally, the character set for duoquaternary signaling is selected so that the received signal results in evenly spaced amplitude levels after processing by a square-law receiver. However, because $\sqrt{2}$ and $\sqrt{3}$ are irrational numbers, it is impossible to perfectly represent these numbers digitally and thus add them for the purpose of calculating the running digital sum. As a compromise, for the purposes of calculating the running digital sum, the amplitude values of $b_k$ are approximated using values that can be digitally represented yet still result in approximately evenly spaced amplitude levels after processing by the square-law receiver. An example of such approximated amplitude values of $b_k$ for duoquaternary is $\{0, 3, 4, 5\}$.

FIG. 3 shows a duoquaternary transmission in which $b_K \in \{0, 3, 4, 5\}$. As compared to the power spectral density of duoquaternary with $b_K \in \{0, 1, \sqrt{2}, \sqrt{3}\}$, the power spectral density of duoquaternary with $B_K \in \{0, 3, 4, 5\}$ is slightly greater and also does not achieve a precise spectral null at the Nyquist frequency. However, even using these approximated values for $b_k$, the resulting spectral bandwidth is still comparable to that of duobinary and results in a doubling of the spectral efficiency of duobinary.

Figure 6:
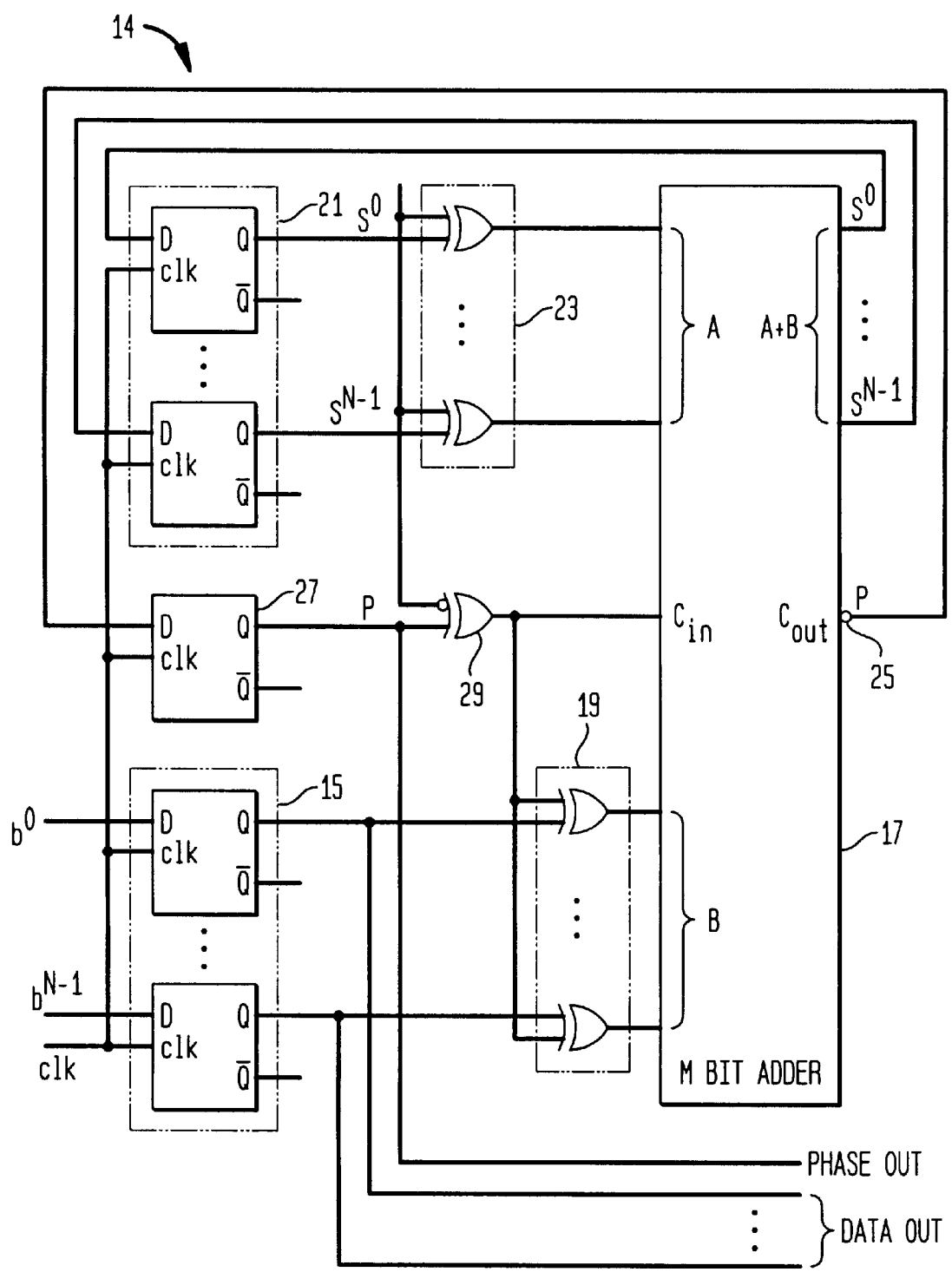
FIG. 6 is a circuit schematic for implementing BOSS coding in accordance with an embodiment of the present invention.

Referring now to FIG. 6, there is shown a phase generator circuit 14 for generating the phase of the current symbol being supplied as a data out output signal for BOSS coding. Inputs $b^0 \ldots b^{N-1}$ are a digital representation of the amplitude of a current symbol being supplied as a data input of circuit 14 and of the next symbol to be supplied as an output (data output) from circuit 14, i.e., the next output symbol. For example, if the output character set includes $\{0, 1, 3, 5\}$, then N=3 because 3 bits are required to represent 5 and $b^0 \ldots b^2=101$. Inputs $b^0 \ldots b^{N-1}$ are connected to the first input B of an adder 17 via latches 15 and xor-gates 19. The outputs $s^0 \ldots S^{N-1}$ from adder 17, which represents the running digital sum, are connected to the second input A of adder 17 via latches 21 and xor-gates 23. The $C_{out}$ output of adder 17, which represents the sign of the sum of A+B, is connected to the $C_{in}$ input of adder 17, through inverter 25, latch 27 and xor-gate 29 and is also connected to the phase out line which represents the phase of the next output symbol. The output of xor-gate 29 is also an input to each of xor-gates 19. Line w is connected as one input to each of xor-gates 23 and is an input to xor-gate 29 through inverter 31. Finally, the data out lines, which contain the symbol to be output next, are connected to the Q outputs of latches 15, respectively.

The operation of phase generator circuit 14 will now be described. The next symbol to be output is input as input B of adder 17 through latches 15 and xor-gates 19 and added to the previously calculated running digital sum which is input to input A of adder 17. A new running digital sum is calculated by adder 17 by adding input A to input B. The new running digital sum is output from adder 17 via outputs $s^0 \ldots s^{N-1}$. $C_{out}$, which, under 2s complement addition, represents the sign of the new running digital sum, is inverted by inverter 25 and output from adder 17 via line p. The inverted sign p is clocked out via latch 27 as the phase of the next output symbol. Inverting $C_{out}$ to generate the phase of the current input symbol supplied to data inputs of latches 15 (the next output symbol) that becomes the current; output symbol when latches 15 are clocked and drives the running digital sum towards zero, as required under BOSS coding.

If line w=0, then the spectral null imposed on the output signal will be located at zero frequency. If line w is raised to 1, then xor-gates 23 act as toggles and have the effect of multiplying the running digital sum by −1—the equivalent of flipping the phase successively—which shifts the spectral null to the Nyquist frequency. Accordingly, circuit 14 can be used to select the output phase according to the BOSS coding method which results in an output signal having increased spectral efficiency.

BLOCK-PHASED (BP) CODING

Because BOSS coding requires the calculating of the spectral sum $I_N(\omega)$ by adding all previously output symbols, BOSS coding is difficult to implement accurately when the output amplitudes $b_k$ includes irrational numbers such as $\sqrt{2}$ and $\sqrt{3}$. In contrast, Block-Phased Coding provides a method of selecting the phase of output symbol $b_k$ so that power spectrum is shifted away from the Nyquist frequency towards zero frequency without having to calculate the running digital sum.

In BP coding, the symbols in the output character set are divided into separate groups, $G_1, G_2 \ldots G_M$. If, for example, symbol $b_1$ from group $G_1$ is the next symbol to be output, then the phase of $b_1$ is selected by determining the number of symbols from the other groups $G_2 \ldots G_N$ that have been output since the most recent symbol output from group $G_1$. If this number is even, then $b_1$, the next symbol to be output, is output with the same phase as the last symbol output from group $G_1$. If this number is odd, then the phase of $b_1$ is switched from the phase of the last symbol output from group $G_1$.

For example, if $G_1 \in \{2, 3\}$ and $G_2 \in \{0,1\}$, input data sequence $a_k = \{2, 0, 1, 3\}$ will be converted to an output data sequence $b_k = \{2, 0, 1, 3\}$ because there are an even number of symbols from group $G_2$ between the last two symbols from group $G_1$. If, on the other hand, $a_k = \{2, 1, 0, 1, 3\}$, then $b_k = \{2, 1, 0, 1, -3\}$ because there are an odd number of symbols from group $G_2$ between the last two symbols from group $G_1$. Thus, the advantage of BP coding over BOSS coding is that no mathematical additions need be performed when selecting the phase of the next symbol to be output.

BP codes can be divided into two categories. Independently Phased Multilevel (IPM) codes, in which the symbol character set is divided into groups each containing a single character, and Degenerately Phased Multilevel (DPM) codes in which the character set is divided into two groups, one of which contains a single symbol.

IPM Codes

In IPM codes, the character set is divided into as many groups as there are symbols in the character set. So, for example, if $B_K \in \{0, 1, 2, 3\}$, the character set will be divided into four groups: $\{0\}, \{1\}, \{2\}$ and $\{3\}$. To determine the proper phase of an output symbol $b_1$ to minimize power spectral density $S_L(\omega)$ of the output signal, the number of symbols from the other groups previously output since the last time $b_1$ was output is counted. As before, if that number is even, then $b_1$ is output with the same phase as last time it was output; if the number is odd, the phase is switched.

To see that a spectral null is achieved at the Nyquist frequency in an IPM code having M groups, reference is made to the autocorrelation function, $R_n$ of BP codes, wherein $$R_0 = \langle b^2 \rangle, \qquad (9)$$

$$R_1 = \sum_{m=1}^{M} p_m^2 \langle b_m \rangle^2, \; R_N = \sum_{m=1}^{M} p_m^2 \langle b_m \rangle^2 (2p_m - 1)^{n-1} \text{ for } n-1$$

where the probability of emitting a symbol from each group is $\{p_1 \ldots p_m\}$, the mean of each of group is $\{\langle b_1 \rangle, \ldots \langle b_M \rangle\}$ and the mean square of each group is $\{\langle b_1^2 \rangle, \ldots \langle b_M^2 \rangle\}$. Substituting the autocorrelation function Rn into equation (4) above, the power spectral density, $S_L(\omega)$ for BP coding at the Nyquist frequency is $$S(\pi) \cdot T_0 = \sum_{M=1}^{M} p_m(\langle b_m^2 \rangle - \langle b_m \rangle^2). \qquad (10)$$

According to equation 10, a spectral null at the Nyquist frequency can only occur when for each group of symbols the mean square, $\langle b_m^2 \rangle$, equals the squared mean, $\langle b_m \rangle^2$. This occurs only when each group consists of a single output symbol, as in IPM coding.

Figure 4:
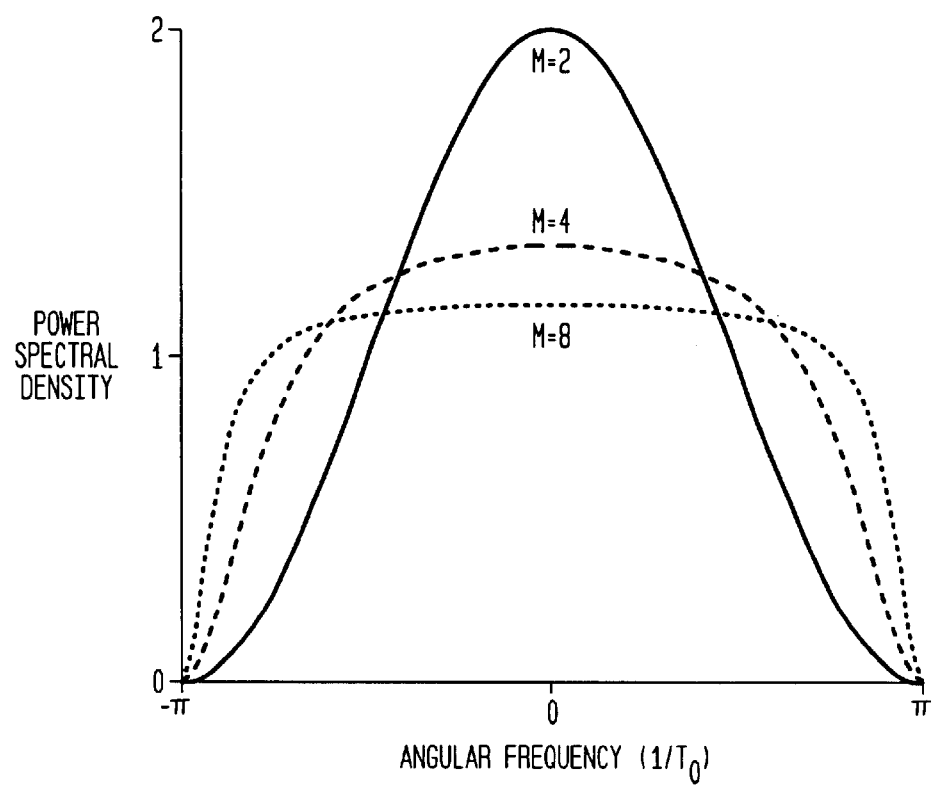
FIG. 4 is a graph comparing the power spectral densities of IPM codes for 2, 4 and 8 groups.

Referring now to FIG. 4, there is shown a series of graphs of power spectral density as a function of angular frequency for IPM codes for M=2, in which one bit of information is coded per output symbol and is identical to duobinary; M=4, in which 2 bits of information is coded per output symbol; and M=8, in which 3 bits of information is coded per output symbol. In all the graphs, the power spectrum achieves a spectral null at the Nyquist frequency. Therefore, by using IPM coding with M=2 and M=3, two and three times the amount of information, respectively, is transmitted, as compared to duobinary, in the same spectral bandwidth.

DPM Codes

In DPM codes, the character set is divided into two groups: the first group containing a single symbol and the second group containing the remaining symbols. For example, if $B_k \in \{0, 1, 2, 3\}$, the character set can be divided into the following two groups: $\{0\}$ and $\{1, 2, 3\}$. In DPM coding, the phase of the next symbol to be output is selected according to the rule for BP coding: the phase is the same as the last symbol output from the group if an even number of symbols from the other group are intervening, and switched if an odd number of symbols from the other group are intervening.

Figure 5:
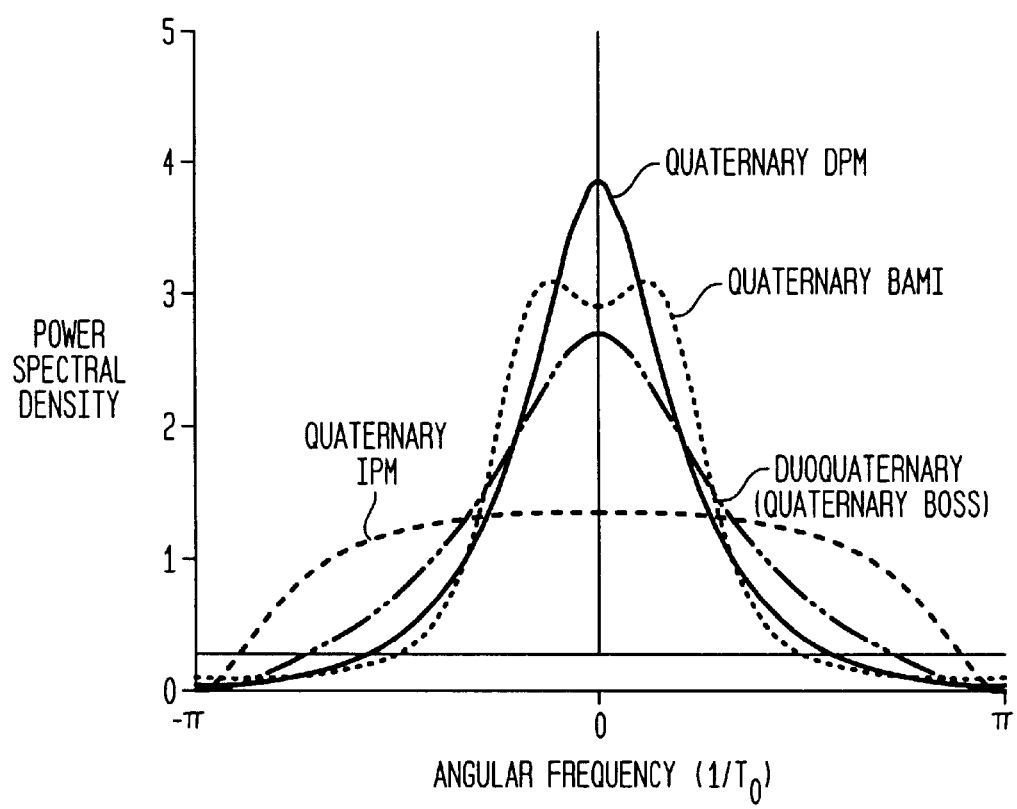
FIG. 5 is a graph comparing the power spectral densities of quaternary BOSS, IPM, DPM and BAMI.

DPM coding differs from IPM coding in that for DPM coding, a precise spectral null is not achieved at the Nyquist frequency. Although a precise spectral null is not achieved for DPM coding, for practical operating purposes the spectral density at the Nyquist frequency is such that it may be treated as a spectral null. This follows from equation (10), which requires that the power spectral density for BP coding at the Nyquist frequency does not go to zero if a group of symbols contains more than one symbol, as is the case for DPM coding. However, even though a spectral null is not achieved at the Nyquist frequency, the advantage of DPM coding over IPM coding is that the spectrum for quaternary DPM is more strongly peaked than that for quaternary IPM, as is shown in FIG. 5. Also, although DPM coding does not achieve a precise spectral null at the Nyquist frequency, the spectrum is sufficiently attenuated at the Nyquist frequency so that a bandpass filter can be narrowed without experiencing any significant degradation.

Figure 7:
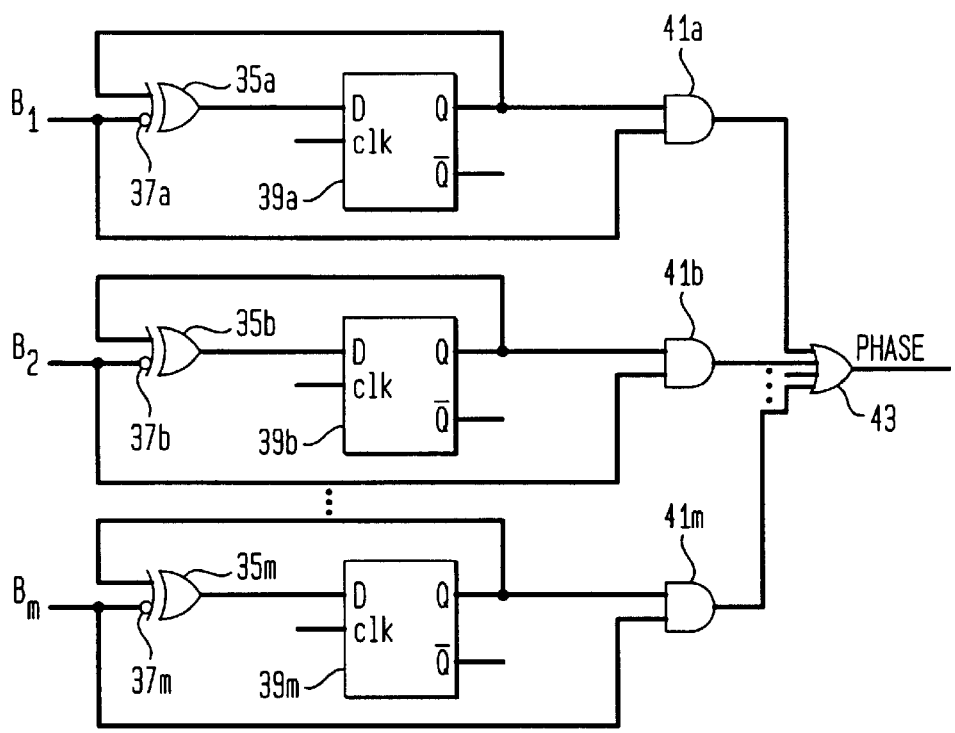
FIG. 7 is a circuit schematic for implementing BP coding in accordance with an alternative embodiment of the present invention.

Referring now to FIG. 7, there is shown a circuit 33 for generating the proper phase for BP coding. Inputs $B_1$, $B_2 \ldots B_M$ are high if the next symbol to be output is from group $B_1, B_2 \ldots B_M$, respectively. Inputs $B_1, B_2 \ldots B_M$ are input to xor-gates 35a . . . 35m through inverters 37a . . . 37m, respectively. The output of xor-gates 35a . . . 35m are input to the D input of latches 39a . . . 39m, respectively. The Q outputs of latches 39a . . . 39m are connected to an input of xor-gates 35a . . . 35b, respectively. Inputs $B_1, B_2 \ldots B_M$ and the Q outputs of latches 39a . . . 39m are inputs to and-gates 41a . . . 41m, respectively. The outputs of and-gates 41a . . . 41m are inputs to or-gate 43.

The operation of circuit 33 will now be described. If the next output symbol is from, for example, group $B_1$, input $B_1$ is high, and, as a result of inverter 37a, xor-gate 35a will output the logic level of the Q output of latch 39a, i.e., xor-gate 35a acts as a pass through. The Q output of latch 39a is gated through and-gate 41a by input $B_1$. This condition continues for as long as the output symbol is from group $B_1$. The result is that when a sequence of symbols from group $B_1$ is emitted, the phase of the next symbol to be output from that group does not change. The output of and-gate 41a is input to or-gate 43 and is used as the phase of the next symbol to be output from group $B_1$.

If a symbol from group $B_2$ is now emitted, input $B_1$ is at logic-level low and, because of inverter 37a, xor-gate 35a acts as a toggle, i.e., the output of xor-gate 35a will be the opposite of the Q output of latch 39a. The toggling of the output of xor-gate 35a, and the Q output of latch 39a, will continue for as long as a symbol from a group other than group $B_1$ is emitted. As a result of this toggling mechanism, the Q output of latch 39a acts as a modulo 2 counter of the number of symbols consecutively output from a group other than group $B_1$. Thus, if an even number of symbols from other groups have been emitted since the last symbol output from group $B_1$, then the logic state of the Q output of latch 39a is the same as when the last symbol from group $B_1$ was previously emitted. If an odd number of symbols from other groups have been emitted since the last symbol from group $B_1$ has been output, then the logic state of the Q output of latch 39a is the opposite of the state when the last symbol from group $B_1$ was previously emitted. At this point, if a group $B_1$ symbol is to be output, the Q output of latch 39a is set either to the same level as it was set to when the last group $B_1$ symbol was output or to the opposite level, depending on whether the number of intervening non-group $B_1$ symbols is even or odd, respectively. The Q output of latch 39a is gated out though or-gate 43 by a high $B_1$ input and is used as the phase of the next symbol to be output. Circuit 33 will likewise keep track of the phase of the next symbol to be output from groups $B_2 \ldots B_M$. In this way, circuit 33 calculates the phase for the next symbol to be output in accordance with BP coding.

Block-AMI (BAMI) Coding

In BP coding, the output character set is grouped, as described above, and the phase of the next output symbol is kept the same if there is an even number of intervening symbols from other group(s) and switched if there is an odd number of intervening symbols from other group(s). In BAMI coding, the output character set is also grouped as in BP coding. However, in BAMI coding, the number of intervening symbols from the other group(s) are not counted. Instead, the phase of the next output symbol is switched if there are any intervening symbols from other group(s) and kept the same if there are no intervening symbols. For example, if $G_1 = \{0\}$ and $G_2 = \{1, \sqrt{-2}, \sqrt{-3}\}$ and $b_k = \{\sqrt{-2}, \sqrt{-2}, 0, 0, \sqrt{-3}\}$, under BAMI coding $b_k = \{\sqrt{-2}, \sqrt{-2}, 0, 0, -\sqrt{-3}\}$).

Referring now to FIG. 5, there is shown a graph of power spectral density as a function of time for quaternary BAMI coding with $B_k \in \{0, 1, \sqrt{-2}, \sqrt{-3}\}$. As can be seen from FIG. 5, quaternary BAMI produces a power spectral density having less peaking at DC than quaternary DPM coding, a sharper fall-off near the half Nyquist frequency, $\pi/2T_0$ and a slightly higher spectral null at the Nyquist frequency than for BP coding. Because of the sharper fall-off at half Nyquist, in a system using BAMI coding, the bandpass filter can be narrowed without significant degradation. This is especially true in a system with a good signal-to-noise ratio, which tends to offset intersymbol interference that may result from narrowing the bandwidth of the bandpass filter to $\pm\pi/2T_0$.

Because BAMI coding allows for the use of significantly narrower bandpass filters and consequently, narrower channel widths, the number of channels multiplexed in a DWDM system may be increased, thereby increasing the aggregated data-capacity of the system.

Figure 8:
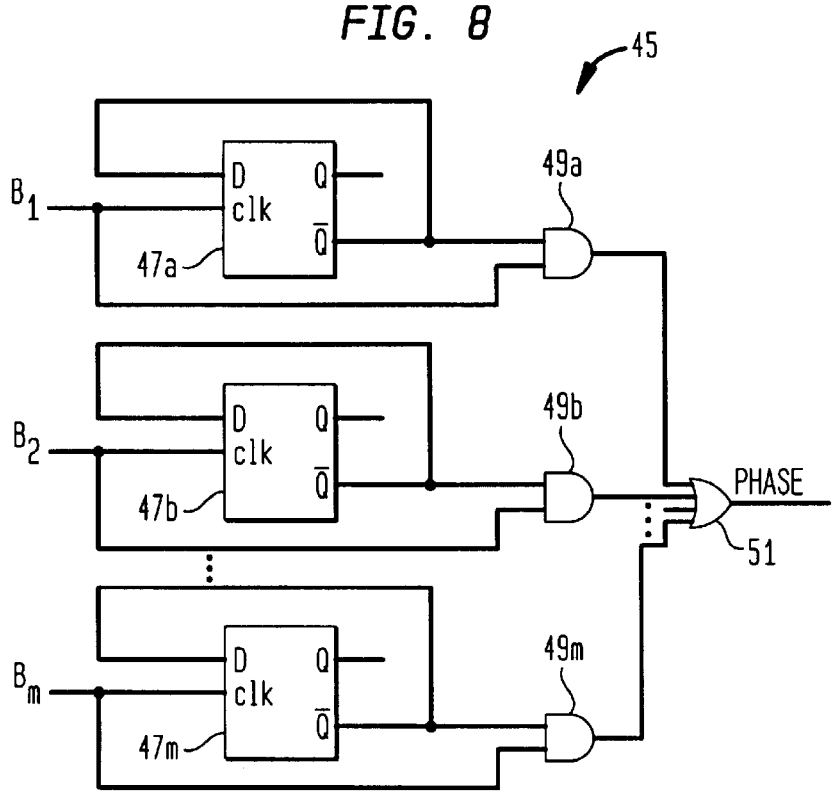
FIG. 8 is a circuit schematic for implementing BAMI coding in accordance with an alternative embodiment of the present invention.

Referring now to FIG. 8, there is shown a circuit 45 for generating the phase for BAMI coding. Inputs $B_1, B_2 \ldots B_M$ are high if the next symbol to be output is from group $B_1$, $B_2 \ldots B_M$, respectively. Inputs $B_1, B_2 \ldots B_M$ are connected to the clock inputs of flip-flops 47a . . . 47m, respectively. Flips-flops 47a . . . 47m are wired so that the Q* output toggles with each transition from logic-level low to logic-level high applied to the clock input. The Q* output of flip-flops 47a . . . 47m and inputs $B_1, B_2 \ldots B_M$ are inputs to and-gates 49a . . . 49m, respectively. Finally, the outputs of and-gates 49a . . . 49m are input to or-gate 51.

The operation of circuit 45 will now be described. If the last output symbol was from, for example, group $B_2$, and the next output symbol is from group $B_1$, a transition from logic-level low to logic-level high is applied to the clock input of flip-flop 47a. This causes Q* output of flip-flop 47a to toggle from its previous logic state. The logic state of Q* output of flip-flop 47a remains at this level until another positive transition occurs on input $B_1$, i.e. a symbol from group $B_1$ is to be output following a symbol from another group. Thus the logic state of Q* tracks the phase change required for BAMI coding. The Q output of flip-flop 47a is gated to or-gate 51 via input $B_1$ and is used as the phase of the next symbol to be output. Circuit 45 will likewise keep track of the phase of the next symbol to be output from groups $B_2 \ldots B_M$. In this way, circuit 33 calculates the phase for the next symbol to be output in accordance with the method for BAMI coding.

Thus, while there have been shown and described and pointed out fundamental novel features as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A method for increasing the spectral efficiency of a transmitted signal, said signal including a sequence of symbols selected from a set of symbols, each of said symbols having an associated numerical value, the method comprising the steps of:

outputting a symbol from said sequence of symbols;

determining a spectral sum by summing the numerical values of all of said symbols that have been previously output;

calculating a first sum by adding the numerical value of the next symbol to be output to the spectral sum;

calculating a second sum by subtracting the numerical value of the next symbol to be output from the spectral sum;

outputting the next symbol to be output with a positive phase if the first sum is less than the second sum; and outputting the next symbol to be output with a negative phase if the first sum is greater than the second sum.

2. The method of claim 1, further comprising the step of outputting the next symbol to be output with a positive phase if the first sum is equal to the second sum.

3. The method of claim 1, further comprising the step of outputting the next symbol to be output with a negative phase if the first sum is equal to the second sum.

4. The method of claim 1, wherein the set of symbols contains four symbols.

5. The method of claim 4, wherein the numerical values of the symbols in the set of symbols are 0, 1, $\sqrt{2}$ and $\sqrt{3}$.

6. The method of claim 4, wherein the numerical values of the symbols in the set of symbols are 0, 3, 4 and 5.

7. An apparatus including a data input and a data output, for use in generating a phase value for each individual symbol in at least one sequence of symbols to be included in a transmit signal, thereby increasing the spectral efficiency of the transmit signal, the apparatus comprising:

an adder circuit having a first input, a second input, a sum output, a carry input and a carry output, a digital representation of a current symbol to be received at said data input to be connected to said first input, said current symbol being a digital representation of the next symbol to be supplied as on output at said data output, said sum output representing a running digital sum to be supplied to said second input; and an inverter having an input and an output, said inverter input being connected to said adder circuit carry output and said inverter output being connected to said adder circuit carry input;

wherein a signal supplied at said inverter output represents the phase of said current symbol to be received at said data in which is said next symbol to be supplied at said data output.

8. The apparatus of claim 7, wherein said digital representation of said next symbol is to be supplied to said adder circuit first input via a first plurality of latches in series with a first plurality of xor-gates.

9. The apparatus of claim 8, wherein said a digital sum developed at said adder circuit sum output is supplied to said adder circuit second input via a second plurality of latches in series with a second plurality of xor-gates.

10. The apparatus of claim 9, wherein said inverter output is to be supplied to said carry input via a latch in series with a prescribed xor-gate.

11. The apparatus of claim 10, wherein said prescribed xor-gate has an output and said output of said prescribed xor-gate is connected as an input to each xor-gate of said first plurality of xor-gates.

12. The apparatus of claim 9, further comprising a signal line having a logic level, said logic level selectable to be either logic-level high or logic-level low, said signal line connected as an input to each xor-gate of said second plurality of xor-gates, said signal line connected as an input to said prescribed xor-gate via a second inverter, so that when said logic-level of said signal line is low, a spectral null is produced at zero frequency and when said logic-level of said signal line is high, a spectral null is produced at the Nyquist frequency of said transmit signal.

13. Apparatus having a data input and a data output for use in increasing the spectral efficiency of a transmit signal including at least one sequence of symbols, the apparatus comprising:

a digital summer to generate a running digital sum of values of symbols in said sequence that have previously been supplied as data out at said data output;

a phase generator utilizing said running digital sum to determine the phase of a symbol in said sequence currently being supplied as data in to said data input and to be supplied as a next output symbol to be supplied as data out at said data output, said phase being determine such that the magnitude of said running digital sum is minimized; and an output circuit to supply said determined phase along with said next output symbol as an output at said data output.

14. A method for use in apparatus having a data input and a data output to increase the spectral efficiency of a transmit signal including at least one sequence of symbols, the method comprising the steps of:

generating a running digital sum of values of symbols in said sequence that have previously been supplied as data out at said data output;

utilizing said running digital sum to determine the phase of a symbol in said sequence currently being supplied as data in to said data input and to be supplied as a next output symbol to be supplied as data out at said data output, said phase being determine such that the magnitude of said running digital sum is minimized; and supplying said determined phase along with said next output symbol as an output at said data output.

* * * * *